United States Patent [19]

Ridgway et al.

[11] 4,199,382

[45] Apr. 22, 1980

[54] MAGNETIC MATERIAL

[75] Inventors: Peter C. Ridgway, Staines; Derek F. Case, Sunbury on Thames, both of England

[73] Assignee: Data Recording Instrument Company Limited, Staines, England

[21] Appl. No.: 870,005

[22] Filed: Jan. 16, 1978

[30] Foreign Application Priority Data

Jan. 20, 1977 [GB] United Kingdom ................ 2200/77

[51] Int. Cl.² .............................................. H01F 1/04
[52] U.S. Cl. .................................... 148/120; 148/121
[58] Field of Search ............................. 148/120, 121

[56] References Cited

U.S. PATENT DOCUMENTS 1,727,550 9/1929 Legg ..................................... 148/121
4,025,379 5/1977 Whetstone ........................... 148/121

Primary Examiner—W. Stallard
Attorney, Agent, or Firm—Hane, Roberts, Spiecens & Cohen

[57] ABSTRACT

A process for producing magnetic elements is disclosed in which magnetic material having a low copper content is utilized and, prior to deposition of copper for acting as a non-magnetic spacer, a layer of isolating material such as nickel is deposited to isolate the copper from the magnetic material so that, after mechanical working of the magnetic material to form an element and the element is annealed to restore its initial magnetic properties, the isolating layer acts to prevent the magnetic properties of the magnetic material from being degraded by the copper layer.

3 Claims, 3 Drawing Figures

U.S. Patent
Apr. 22, 1980
4,199,382
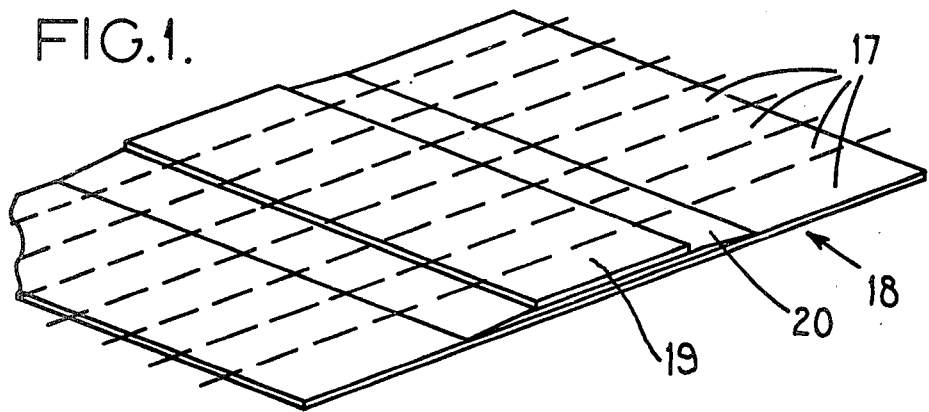
FIG.1.
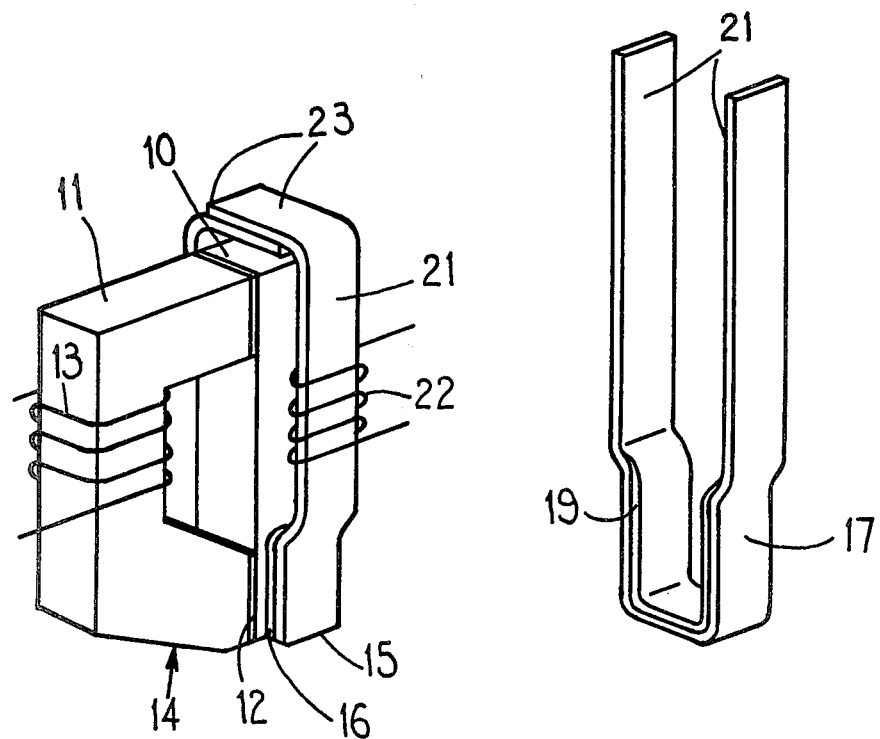
FIG.3.
FIG.2.

MAGNETIC MATERIAL

BACKGROUND OF THE INVENTION

This invention relates to magnetic materials which are suitable for use in the manufacture of magnetic transducing heads.

Magnetic transducing heads for reading, writing or erasing signals, such as are utilized in digital recording on magnetic tape or disc, frequently employ elements made of a magnetic alloy. In some forms of construction, the elements are coated with a layer of copper, which may act as a gap spacing shim, or as an electrostatic or eddy current shield, for example.

We have found that the presence of this copper layer can produce, in some instances, a substantial change in the magnetic properties of the magnetic element. Such a change may vary from one element to another, so that heads made from the elements have an unacceptably wide variation of the operating parameters, and may even be unusable.

SUMMARY OF THE INVENTION

According to one aspect of the invention a process for producing an element for use in a magnetic transducing head includes the steps of selecting a sheet of magnetic material which has a low copper content and provides substantially the magnetic properties which are desired in said element; applying to at least part of one surface of the magnetic sheet an isolation layer which is substantially impervious to migration of copper at the annealing temperature of the magnetic sheet; applying a copper layer over at least part of the isolation layer, the copper layer not extending over the magnetic sheet; mechanically working the sheet to form the desired element, such working producing a change in the magnetic properties of the sheet; and thereafter annealing the sheet to produce the element with the desired magnetic properties.

According to another aspect of the invention a composite material for the manufacture of an element for use in a magnetic transducing head includes a sheet of magnetic material which has a low copper content and provides substantially the magnetic properties which are desired in the element; an isolation layer formed on at least part of one surface of the magnetic sheet, the layer being substantially impervious to the migration of copper at the annealing temperature of the sheet; and a copper layer formed over at least part of said isolation layer, and not extending over the surface of the magnetic sheet.

DESCRIPTION OF THE DRAWINGS

The invention will now be described in more detail with reference to the accompanying drawings in which:

FIG. 1 shows a composite material in accordance with the invention.

FIG. 2 shows a magnetic element formed from the composite material and

FIG. 3 shows a magnetic head incorporating a magnetic element formed from the composite material.

DESCRIPTION OF THE PREFERRED EMBODIMENT

The head, shown in FIG. 3, is intended to provide a read/write facility together with a straddle erase facility. The read/write facility is provided by a conventional core and coil arrangement consisting of an I core element 10 and a C core element 11 of ferrite material bonded together by a non-magnetic material such as glass to provide a non-magnetic transducing gap 12. A coil 13 is wound on the C core element 11. In operation a magnetic recording medium, not shown, passes over the pole face area 14 so as to pass across the transducing gap 12. This pole face area is approximately 0.1 mm wide, with a narrow read/write gap extending across the width of the pole face.

The straddle erase facility is provided by two magnetic erase poles 15 (of which only one is visible in FIG. 3) positioned on opposite sides of the main pole face area 14, downstream of the read/write gap 12. The width of each erase pole 15 is approximately 0.025 mm and it is separated from the main pole face 14 by an erase gap 16. A convenient way of forming the erase head is to bend a strip 17 of magnetic material into a hairpin shape, which is fitted over the read/write core 10,11. Each erase gap 16 is defined by a thin layer of copper which is formed on one face of the strip 17.

The hairpin element may be made in the following manner. A sheet of a magnetic material 18, such as that supplied under the trade name HIMU 800, has deposited on it by electrolytic deposition a layer of copper 19. The thickness of the copper layer 19 is equal to the desired erase gap 16, and the thickness of the magnetic sheet is equal to the desired width of the erase pole 15.

Strips 17 are now cut from the sheet and bent round to form a hairpin of magnetic material which has the copper layer 19 on the inside, as shown in FIG. 2.

However, it is found that the mechanical working, which is required to form the hairpin, induces mechanical stresses which impair the magnetic properties. Accordingly, the hairpin must be heated to the annealing temperature to relieve the stresses. It is to be expected that this would return the magnetic properties substantially to their original values. This does not always take place, and microscopic examination with spectographic analysis has shown that, in such instances, there has been some migration of copper into the magnetic material, across the nominal interface. It appears that this migration occurs entirely, or at least primarily, during the annealing.

This degradation in magnetic properties is prevented by first depositing a layer 20 of isolating material on the surface of the magnetic sheet 18 and then depositing the copper 19 on top of the isolating material 20. The combined thickness of the isolating and copper layers is made equal to the desired erase gap 16. The isolating material must be compatible with both the magnetic alloy and with copper, must be capable of withstanding the annealing temperature and must act as a barrier to migration of the copper. One suitable isolating material is nickel, but other suitable materials may be used, depending upon the particular magnetic alloy which is used and the mechanical requirements of the head.

It will be appreciated that the process may be applied to any magnetic alloy which has a low copper content and is therefore susceptible to copper migration during heat treatment.

The hairpin element shown in FIG. 2 is secured to the I core element 10 with the loop of the hairpin beyond the pole face area 14 and the leg portions 21, on which there is no copper layer, extending alongside each side of the I core element 10. Erase coil windings 22 (of which only one is shown) are placed on each of the leg portions 21 and the free ends 23 of the leg portions 21 are bent down into overlapping engagement. The loop of the hairpin is cut away and the ends of the strip are ground, or lapped, flat to provide erase pole faces adjacent the pole face area of the read/write core.

It will be understood that although the invention has been described in relation to a particular head construction, magnetic elements constructed or produced in accordance with the present invention may be utilized in the construction of core elements for other constructions of magnetic head.

We claim:

1. A process for producing an element for use in a magnetic transducing head including the steps of selecting a sheet of magnetic material which has a low copper content and provides substantially the required magnetic properties; applying to at least part of one surface of the magnetic sheet an isolation layer of nickel which is substantially impervious to migration of copper at the annealing temperature of the magnetic sheet; applying a copper layer over at least part of the nickel layer so that the copper layer is wholly isolated from the magnetic sheet by the nickel layer; cutting a piece from the sheet of material, the piece including a portion carrying a part of said nickel and copper layers, and bending the piece without substantially changing its cross-sectional area to form the desired element, the cutting and bending operations inducing mechanical stresses causing changes in the magnetic properties of the magnetic material; and thereafter heating the element to its annealing temperature to relieve said mechanical stresses and thereby to restore the magnetic properties.

2. A process as claimed in claim 1 including the step of securing the element to a magnetic core with the copper layer adjacent the magnetic core said copper layer acting as a non-magnetic spacer between the magnetic element and the magnetic core.

3. A process as claimed in claim 1 in which the magnetic material consists of HIMU 800.

* * * * *